UNITED STATES PATENT OFFICE.

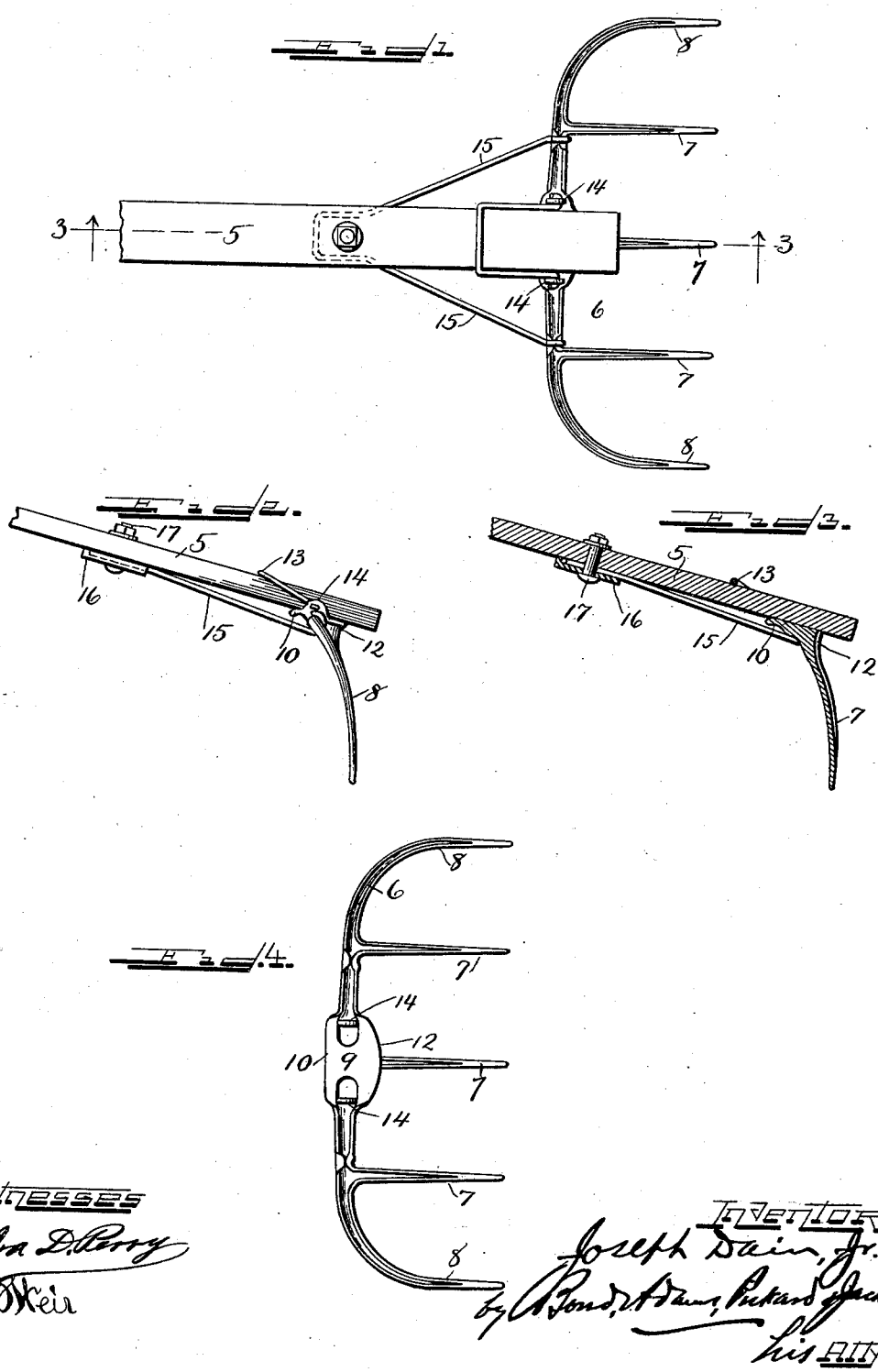

JOSEPH DAIN, JR., OF OTTUMWA, IOWA.

RAKE FOR HAY-LOADERS.

SPECIFICATION forming part of Letters Patent No. 676,304, dated June 11, 1901.

Application filed July 5, 1900. Serial No. 22,575. (No model.)

*To all whom it may concern:*

Be it known that I, JOSEPH DAIN, Jr., a citizen of the United States, residing at Ottumwa, in the county of Wapello and State of Iowa, have invented certain new and useful Improvements in Rakes for Hay-Loaders, of which the following is a specification, reference being had to the accompanying drawings.

My invention relates to rakes for agricultural implements, and has for one object to provide an improved construction of rake by which the rake-teeth will be held normally in operative position, but will be permitted to swing backward under extraordinary strain, as when an obstruction is met, and will also be permitted to swing forward whenever necessary in the operation of the machine.

My improved rake is especially suitable for use in hay-loaders; but it may be used in any other situation to which it is adapted.

A further object of my invention is to provide an improved rake the construction of which will permit of its parts being readily assembled and which may be economically manufactured.

One of the principal features of my invention consists in providing the rake tooth or teeth with an extended rocker-bearing arranged longitudinally of the rake-supporting bar, the extended portion of the bearing serving to resist swinging of the rake-tooth in one direction, thereby retaining it normally in raking position. By placing such extended portion of the bearing at the forward side the swinging forward of the rake-tooth would be resisted, while by placing the extension so as to project backward, backward movement of the rake-tooth would be resisted by it.

A further improvement consists in providing the rake-tooth with an extended rocker-bearing having two extensions, one projecting forward and the other backward, so as to resist movement of the tooth in both directions.

A further improvement consists in providing improved spring mechanism for holding the rake-tooth normally in operative position, while permitting it to swing as may be necessary in the operation of the machine.

Another improvement consists in providing an improved stop by which the extent to which the rake-tooth can be swung is limited.

In the accompanying drawings, Figure 1 is a plan view of the lower end of the rake-bar of a hay-loader, illustrating my improved rake, the rake-teeth being turned back. Fig. 2 is a side elevation illustrating the teeth in operative position. Fig. 3 is a longitudinal section on line 3 3 of Fig. 1, and Fig. 4 is a plan view of the rake detached from the bar.

Referring to the drawings, 5 indicates the rake-bar of a hay-loader.

6 indicates the rake, which in the form illustrated is provided with five substantially rigid teeth, the intermediate teeth 7 being substantially straight, the end teeth 8 having their inner ends curved, as shown in Fig. 4, the effect being to make the ends of the rake curved or rounded, so that they do not project in such manner as to engage hay when moved backward. The rake 6 is provided centrally on its upper side with a bearing-plate 9, which has a forwardly-projecting lip 10 and a rearwardly-projecting lip 12. The latter is longer than the former, as illustrated in Figs. 2 and 4. Said lips are adapted to bear against the under side of the rake-bar 5, as shown in Fig. 2, and under ordinary conditions when both said lips bear against said bar the rake-teeth are in their normal operative position, as shown in Fig. 2.

13 indicates a bail which is adapted to embrace the lower portion of the rake-bar 5 and has its ends secured to ears 14, which rise from the ends of the plate 9. As hereinafter described, the bail 13 serves to limit the movement of the rake as it rocks on the plate 9 and assists in preventing it from being displaced.

15 indicates a forked spring, the ends of which are looped around or otherwise loosely secured to the rake 6, as shown in Fig. 1, its doubled end being adapted to rest against the rake-bar 5, as shown in Figs. 2 and 3, to which it is secured by a clamping-plate 16 and bolt 17. As shown in Fig. 3, the clamping-plate 16 is elongated and extends over a considerable portion of the spring 15, so that it binds said spring tightly against the rake-bar and has a tendency to prevent the ends of the spring 15 from moving down away from the bar 5. The normal position of the rake-teeth is shown in Fig. 2, the plate 9 being parallel with the adjacent side of the bar 5.

When, however, the teeth 8 are moved forward, the lip 10 engages the opposite surface of the bar 5, the rake turning upon said lip as a center, consequently carrying the ends of the spring 15 away from said bar, putting them under greater tension, so that when the teeth are released they return at once to their normal position. When the rake-teeth are moved back, as when an obstruction is encountered, the rake turns upon the lip 12 as a center, the spring 15 being similarly placed under tension; but as the lip 12 is longer than the lip 10 the action of the spring when the teeth 8 are moved back is much greater than when they are moved forward. Consequently it requires greater pressure to move the teeth back any considerable distance than to move them forward. When the rake-teeth are swung backward, turning on the lip 12, as above described, the ears 14 move away from the bar 5, moving the ends of the bail in the same direction. The extent to which said ears may move away from the bar is, however, limited by the length of the bail, since the bail embraces the rake-bar.

It will be noted that the parts of the rake are secured to the rake-bar solely by the bolt 17, so that they may be readily assembled and separated. Furthermore, the construction described makes it practicable to make the rake integral, and it may either be stamped out of steel, as illustrated in the drawings, or be cast, thus reducing the expense of manufacture over prior devices for the same purpose.

If it be desired to adjust the tension of the spring 15, it may be accomplished by loosening the bolt 17, thereby adjusting the clamping-plate 16, so that the spring is not bound so tightly against the rake-bar.

I have described the invention illustrated in detail, but do not wish to be restricted to the details shown except in so far as they are specifically claimed, as my invention includes modifications.

That which I claim as my invention, and desire to secure by Letters Patent, is—

1. The combination of a suitable support, a rake carried thereby and having a rocker-bearing thereon extended longitudinally thereof, and means holding said rake-bearing in contact with said support, substantially as described.

2. The combination of a suitable support, a rake carried thereby and having a rocker-bearing thereon extended longitudinally thereof, and means yieldingly holding said rake-bearing in contact with said support, substantially as described.

3. The combination of a rake-bar, a rake carried thereby and having a rocker-bearing thereon extended longitudinally thereof, and a spring carried by said rake-bar and acting to press said rake-bearing thereagainst, substantially as described.

4. The combination of a rake-bar, a rake carried thereby and having a rocker-bearing thereon extended longitudinally thereof, a spring carried by said rake-bar and acting to press said rake-bearing thereagainst, and means for limiting the extent to which said rake may rock, substantially as described.

5. In a rake, the combination of a rake-bar, a rake arranged to rock backward and forward of its operative position, said rake having a rocker-bearing extended longitudinally of the rake-bar, and a spring normally holding said rake in operative position, substantially as described.

6. In a rake, the combination of a rake-bar, a rake arranged to rock backward and forward of its operative position, said rake having a rocker-bearing extended longitudinally of the rake-bar, a spring normally holding said rake in operative position, and means for limiting the movement of said rake, substantially as described.

7. In a rake, the combination of a rake-bar, a rake arranged to rock backward and forward of its operative position, said rake having a bearing extended longitudinally of the rake-bar, a spring normally holding said rake in operative position, and a bail secured to said rake and extending over said rake-bar for limiting the movement of said rake, substantially as described.

8. In a rake, the combination of a rake-bar, a rake arranged transversely thereof, said rake being arranged to rock backward and forward of its operative position, a spring for normally holding said rake in its operative position, and a bail secured to said rake and extending over said rake-bar for limiting the movement of said rake, substantially as described.

9. The combination of a rake-bar, a rake arranged transversely thereof and having a bearing thereagainst, a spring, means for binding one end of said spring against said bar, the other end of said spring being arranged to hold the bearing of the rake normally against the rake-bar, and a projecting lip carried by said rake and adapted to bear against said bar when the rake is rocked, substantially as described.

10. The combination of a rake-bar, a rake arranged transversely thereof and adapted to bear thereagainst, a spring, means for binding one end of said spring against said bar, the other end of said spring being connected to said rake, and projecting lips carried by said rake and extending in opposite directions, said lips being adapted to bear against said rake-bar when the rake is rocked, substantially as described.

11. The combination of a rake-bar, a transversely-arranged rake having forwardly and rearwardly projecting lips 10, 12, respectively, said lip 12 being longer than the lip 10, a spring 15 secured at its rear ends to said rake, and means for binding the forward portion of said spring against said rake-bar, substantially as described.

12. The combination with a suitable support, of a rocking rake carried thereby, said rake being adapted to rock forward and back of its operative position, spring mechanism for normally holding said rake yieldingly in its operative position, and means for holding said rake more strongly against backward movement than against forward movement, substantially as described.

13. The combination with a suitable support, of a rake carried thereby and having a bearing thereon extended longitudinally thereof, the extended portions of said bearing consisting of forwardly and backwardly extending lips, the forward lip being the shorter, and spring mechanism normally holding said rake yieldingly in operative position, substantially as described.

JOSEPH DAIN, Jr.

Witnesses:
J. D. BROWNING,
P. F. ARBENZ.